(12) United States Patent
Allard

(10) Patent No.: US 6,905,599 B2
(45) Date of Patent: Jun. 14, 2005

(54) PREFILTER FOR WATER TREATMENT

(75) Inventor: Douglas Allard, Santa Rosa, CA (US)

(73) Assignee: KriStar Enterprises, Inc., Santa Rosa, CA (US)

( * ) Notice: Subject to any disclaimer, the term of this patent is extended or adjusted under 35 U.S.C. 154(b) by 0 days.

(21) Appl. No.: 10/656,400

(22) Filed: Sep. 4, 2003

(65) Prior Publication Data

US 2004/0173522 A1 Sep. 9, 2004

Related U.S. Application Data

(60) Provisional application No. 60/452,241, filed on Mar. 4, 2003.

(51) Int. Cl.[7] .................................................. C02F 3/32
(52) U.S. Cl. ...................... 210/602; 210/747; 210/170
(58) Field of Search ................................ 210/602, 747, 210/163–166, 170

(56) References Cited

U.S. PATENT DOCUMENTS

| | | | | | |
|---|---|---|---|---|---|
| 4,783,266 A | * | 11/1988 | Titch et al. | ................. | 210/695 |
| 5,043,061 A | * | 8/1991 | Inagaki | ...................... | 210/151 |
| 5,322,629 A | * | 6/1994 | Stewart | ...................... | 210/767 |
| 5,595,652 A | * | 1/1997 | Rainer | ........................ | 210/282 |
| 5,788,849 A | * | 8/1998 | Hutter et al. | .............. | 210/163 |
| 6,337,025 B1 | * | 1/2002 | Clemenson | ................. | 210/747 |
| 6,569,321 B2 | * | 5/2003 | Coffman | ..................... | 210/150 |

FOREIGN PATENT DOCUMENTS

DE 4422496 A1 * 1/1996

OTHER PUBLICATIONS

Vanson, Inc., web page: "Chitin & Chitosan;" http://www.vanson.com/corporate/platforms/chitosan/chitosan.shtml, 1 page, 2003.

Vanson, Inc., webp page: "The Science;" http://www.vanson.com/corporate/platforms/chitosan/science.shtml, 2 pages, 2003.

Vanson, Inc., web page: "Uses for Chitosan;" http://www.vanson.com/corporate/platforms/chitosan/uses.shtml. 2 pages, 2003.

Vanson, Inc., web page: "Storm–Klear™;" http://www.vanson.com/stormklear_index.shtml, 1 page, 2003.

Vanson, Inc., web page: "Liqui–Floc™;" http://www.vanson.com/stormklear/liquifloc.shtml, 2 pages, 2003.

Vanson, Inc., web page: "Storm–Klear Liqui–Floc™ User Guide;" http://www.naturalsitesolutions.com/Liqui–Floc_UserGuide.html, 2 pages, 2003.

Vanson, Inc., web page: "Gel–Floc™" http://www.vanson.com/stormklear/gelfloc.shtml, 2 pages, 2003.

Vanson, Inc., web page: "Suggested Applications for the Storm–Klear Gel Floc™;" http://www.vanson.com/stormklear/techdocs/gelfloc_applications.pdf, 2 pages, 2003.

Vanson, Inc., web page: "Storm–Klear Gel Floc ™ Clean Construction Site Storm Water Fast;" http://www.vanson.com/stormklear/techdocs/gelfloc_factsheet.pdf, 2 pages, 2001.

* cited by examiner

*Primary Examiner*—Fred G. Prince

(57) ABSTRACT

An apparatus and method for use in conjunction with grassy swales and sidewalk cross drains to collect and filter or otherwise treat dirty or polluted storm water runoff or other fluid is disclosed. One or more prefilters are installed at one or more inlets to a grassy swale or a sidewalk cross drain, such that at least a portion of any storm water runoff or other passing fluids are at least partially filtered or otherwise treated to some extent before entering the grassy swale. The prefilters comprise an inlet adapted to deliver fluid therethrough; an outlet adapted to deliver fluid therethrough, one or more structural elements connecting to inlet to the outlet, and one or more filtration elements attached to at least one of the structural elements.

18 Claims, 4 Drawing Sheets

PREFILTER FOR WATER TREATMENT

This application claims the benefit of priority of the U.S. provisional application 60/452,241 filed Mar. 4, 2003, which is incorporated by reference.

TECHNICAL FIELD

The present invention relates generally to apparatuses and methods for treating or filtering fluids, and more particularly to apparatuses and methods for use in conjunction with grassy swales and sidewalk cross drains to collect and filter dirty or polluted water.

BACKGROUND

In response to tighter guidelines recently imposed by environmental and regulatory agencies, the control of pollution, silt and sediment found in storm water runoff and other sources of water is receiving ever-increasing attention at all levels of federal, state, and local government. Federal and state agencies have issued mandates and developed guidelines regarding the prevention of non-point source (storm water caused) pollution that require action by governmental entities. These mandates affect the management of water runoff from sources such as storms, slopes, and construction sites. In addition, there are many other laws and regulations in place that restrict the movement or disposal of significant amounts of water. Such laws and regulations have a significant impact on, for example, the ways that states, municipalities, highway authorities and other responsible bodies can drain or otherwise dispose of storm runoff or other water falling on or passing over highways, roadways, parking lots and the like.

Grassy swales, also known as grassy drainage swales, vegetated swales, or simply "swales," are a common and well known way of filtering, treating and/or draining storm runoff or other dirty water that falls on and/or passes over highways, roadways, parking lots and the like. Such swales are routinely designed as one or more parts of an overall drainage infrastructure for storm water runoff, along with other less aesthetically pleasing elements, such as gutters, dams, sewers, aqueducts and the like. Unlike many of these other structures, however, grassy swales are preferred for their more pleasing appearance and their ability to provide a natural means for filtering and otherwise treating passing storm water or fluid runoff.

In a typical application, a swale is specifically sized to handle the estimated amount of runoff from an adjacent land improvement for a given time period, for example, ten years. At that time, the party responsible for the swale, such as a municipality, highway authority, developer or property owner, will typically conduct a reconstructive overhaul or replanting of the grass layer in the swale, as it is only a matter of time before pollutants and contaminants overrun the grass and topsoil layers of the swale. Frequently, such an overhaul or reconstruction may be needed ahead of schedule, due to the generally incessant flow of chemicals and pollutants from roadways and similar structures that are washed into swales and drainage systems by storms and other runoff events. Such overhauls or reconstructions are costly and time consuming, and additional problems may ensue in the event that they are delayed or needed ahead of schedule. For example, a weak or failing swale may undesirably pass an inordinate amount of pollutants, sedimentation and other debris onward into a subsequent drainage system during the time that it takes to overhaul or replant the swale. In addition, as regulations tighten or various applications require a higher standard of filtration or pollutant removal, many typical swales and other current methods and systems for removing pollutants or silt may prove to be inadequate.

Similarly, sidewalk cross drains are also commonly used to filter, treat, or drain storm runoff or other dirty water that falls on or passes over highways, roadways, parking lots and the like. As in grassy swales, sidewalk cross drains are routinely designed as one of many parts of an overall drainage infrastructure for storm water runoff, along with other elements, such as gutters, dams, aqueducts, and the like. Although sidewalk cross drains are useful for their ability to treat water in a small area in the ground underneath narrow sidewalks, increased filtering capacity is desired to adequately treat water before it enters subsequent drainage systems.

Accordingly, there exists a need for more effective methods and apparatuses for filtering and treating polluted or dirty water, such as storm water runoff, falling on or passing over highways, roadways, parking lots and the like. In particular, there exists a need for alleviating the work load that is carried by some grassy swales and sidewalk cross drains in terms of the amount of sedimentation, silt, pollution and other unwanted items that they are required to remove over the course of their life spans.

SUMMARY

The present invention provides more effective methods and apparatuses for filtering and treating polluted or dirty water, such as storm water runoff, that passes over highways, roadways, parking lots and the like. One particular advantage of the present invention is the reduction in the workload required by water treatment systems to remove the required amount of sedimentation, silt and pollution over the course of their life spans.

Our embodiment of the present invention provides a water treatment apparatus comprising an inlet adapted to allow fluid flow therethrough; along with an outlet adapted to allow fluid flow therethrough. One or more structural elements connect the inlet to the outlet. One or more filtration elements are connected the structural elements.

In another aspect of the present invention, an apparatus adapted to cooperatively engage with a grassy swale comprises an inlet and an outlet adapted to deliver fluid therethrough. One or more structural elements connect the inlet to the outlet. One or more filtration elements are attached to at least one of the structural elements.

In another aspect of the present invention, a grassy swale prefilter comprises a structural framework adapted to support one or more filtration elements. An inlet, is connected to structural framework and adapted to deliver fluid therethrough. An outlet is connected to the structural framework and adapted to deliver fluid therethrough. A walled basin is connected to the structural framework and contains one or more filtration elements. One or more filtration screens are disposed above the walled basin and removably attached to the structural framework.

A further aspect of the present invention pertains to prefiltering fluid prior to entry into a grassy swale, comprising selecting an inlet of said grassy swale, selecting a grassy swale prefilter, coupling the grassy swale prefilter to the grassy swale inlet and passing fluid through the grassy swale prefilter.

Other apparatuses, methods, features and advantages of the invention will be apparent to one with skill in the art upon examination of the following figures and detailed description. All such additional systems, methods, features and advantages are included within this description and are encompassed within the scope of the invention.

BRIEF DESCRIPTION OF THE DRAWINGS

The included drawings are for illustrative purposes and provide examples of possible structures for the disclosed inventive grassy swale prefilter. These drawings in no way limit any changes in form and detail that may be made to the invention by one skilled in the art without departing from the spirit and scope of the invention.

DETAILED DESCRIPTION

An example application of a system and method according to the present invention is described in this section. This example is being provided solely to add context and aid in the understanding of the invention. Other applications are possible, such that this example should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, these examples are not limiting. Other embodiments may be used, and changes may be made without departing from the spirit and scope of the invention.

One advantage of the present invention is the provision of more effective methods and apparatuses for filtering and treating polluted or dirty water, such as storm water runoff, that passes over highways, roadways, parking lots and the like, such that whatever fluid eventually makes its way into a final drainage infrastructure or destination is likely to be cleaner. This advantage is realized by providing an apparatus and method for pre-filtering storm water runoff or other fluid when such fluid enters a water treatment system, such as a grassy swale or sidewalk cross drain.

Another advantage of the present invention is the reduction of the workload required of one or more grassy swales in terms of the amount of sedimentation, silt and pollution that they are required to remove over the course of their life spans. These advantages can be accomplished by installing a grassy swale prefilter at one or more inlets to a grassy swale, such that at least a portion of any storm water runoff or other passing fluids are at least partially filtered or otherwise treated to some extent before entering the grassy swale. These and other useful objects are achieved by the improved devices and methods disclosed herein.

Figure 1:
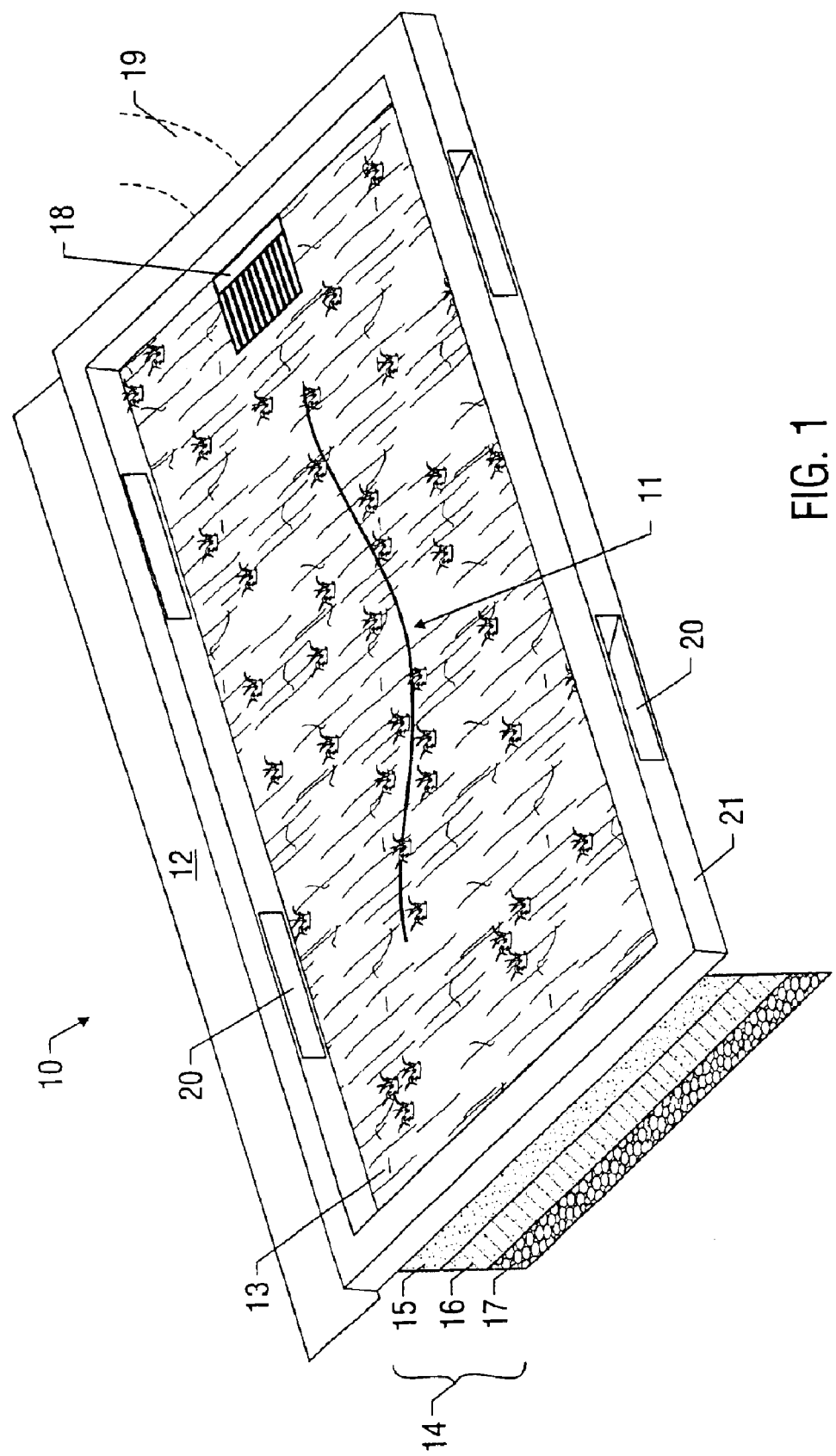
FIG. 1 is a top perspective view of an example of a grassy swale.

Referring now to FIG. 1, an example of a grassy swale is illustrated in top perspective view. In a typical application, a grassy swale 10 comprises a depression 11 in the ground adjacent to a land improvement 12 such as a highway, road, parking lot, subdivision or other similar development. The depression 11 is substantially covered with a layer of grass 13 that has become well rooted and established within the grassy swale 10. The type of grass or other suitable vegetation comprising layer of grass 13 may be one of any number of different types, as will be readily understood by one skilled in the art, with such a type being capable of naturally removing pollutants from storm water or other fluid runoff as the fluid infiltrates the soil. The ground 14 underneath grass layer 13 may be comprised of one or more layers, with a top layer 15 preferably of soil that is conducive to the growing of grass or other like vegetation, a middle layer 16 of gravel or coarse dirt, and a bottom layer 17 of clay or bedrock. All such ground levels are not necessary, and alternative ground configurations are possible, as is known in the art.

As passing fluid 1 enters the grassy swale from a roadway or parking lot 12, for example, it first encounters grass layer 13 and topsoil layer 15, which are regions where many pollutants such as grease, oils and hydrocarbons are naturally filtered by these organic layers. Of course, most all large particles and many smaller particles, silt and fine debris originally found in passing fluid 1 will also be filtered out from the passing fluid by these grass and topsoil layers. Passing fluid 1 then proceeds through any middle ground layers 16, and then along a bottom layer 17, if present, to an outlet drain 18 and subsequent drainage system 19, if present, where it can be directed toward a bay, river, estuary, ocean or the like.

Figure 2:
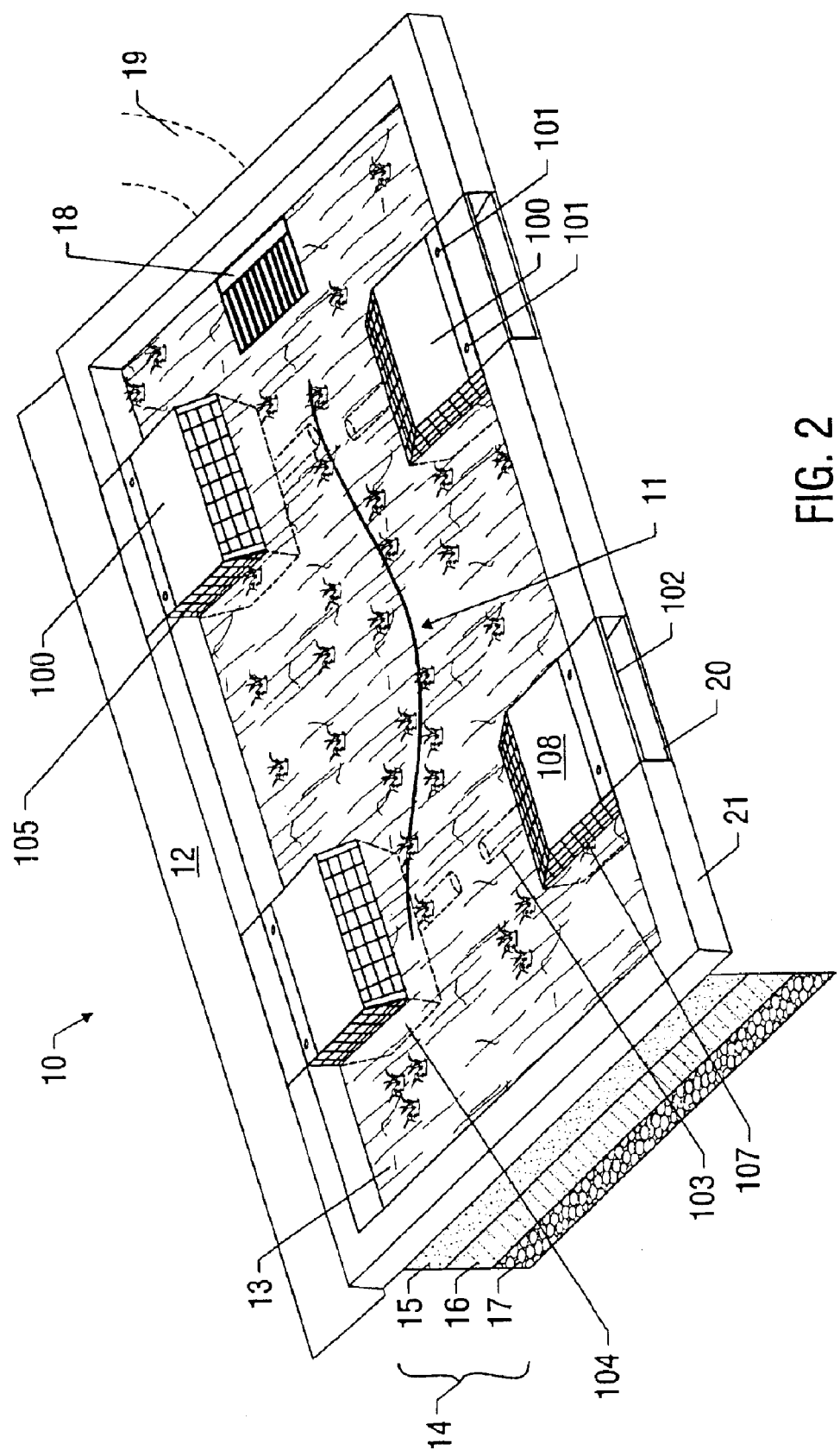
FIG. 2 illustrates in top perspective view an overview example of a grassy swale incorporating a plurality of grassy swale prefilters according to one embodiment of the present invention.

Referring now to FIG. 2, an overview example of a grassy swale incorporating a plurality of grassy swale prefilters according to one embodiment of the present invention is illustrated in top perspective view. Grassy swale 10 comprises several features that are substantially similar to those as illustrated in FIG. 1 above, such as a depression 11 in the ground adjacent to a parking lot 12. Depression 11 is substantially covered with a layer of grass 13 that covers ground 14 comprised of a topsoil layer 15, a middle gravel layer 16, and a bottom clay layer 17. An outlet drain 18 and subsequent drainage system 19 are also present in this grassy swale, as are a plurality of grassy swale inlets 20.

These grassy swale inlets may comprise openings in a cement or asphalt curb 21, such as those depicted in FIG. 2, or may comprise a variety of other such openings or forms depending upon the particular neighboring structure, which comprises parking lot 12 as depicted in FIG. 2. As shown, storm runoff or fluid escaping parking lot 12 will flow towards and along curb 21, eventually arriving at one or more of these openings comprising grassy swale inlets 20. Accordingly, substantially all fluid that will flow from parking lot 12 to grassy swale 10 will flow through one of these openings or inlets 20. Alternatively, as in the case of some highways, for example, a grassy swale may not comprise distinctive inlets, such that the entire longitudinal edge of a highway effectively comprises the grassy swale inlet. In such cases, one or more troughs or other devices may preferably be employed, such that one or more artificial inlet points are created for installation of one or more grassy swale prefilters according to the present invention.

Again referring to FIG. 2, a plurality of grassy swale prefilters 100 or "prefilters" are coupled to the plurality of grassy swale inlets 20, such that substantially all fluid flowing through these inlets will need to flow into these grassy swale prefilters. Such a coupling between a prefilter 100 and a curb 21 or other structure comprising a grassy swale inlet may be achieved by any suitable coupling means, as would be readily understood by one skilled in the art. For example, one or more support posts 101, preferably two, may be cast or otherwise inserted into the concrete or asphalt curb 21, such support posts providing an anchor for attaching a structural framework of the grassy swale prefilter. Of course, this structural framework is preferably specifically designed to receive and be supported by these support posts in at least a lateral direction. Additionally, each prefilter 100 is designed to have optimal dimensions for a particular size curb opening or grassy swale inlet, to increase the effectiveness of the coupling with the inlet.

In a preferred embodiment, one or more grassy swales reside within a portion of the grassy swale itself. In this manner, the grassy swale inlet 20 is effectively converted into a grassy swale prefilter inlet 102 once the prefilter is installed. Each grassy swale prefilter 100 also comprises at least one outlet 103, which is preferably located below ground level such that discharged fluid can bypass one or more grassy swale layers, such as grass layer 13 and topsoil layer 15. Such an arrangement is acceptable in instances of fluid having successfully passed through all designed filtration and/or treatment elements of the prefilter, such that exposure to a grass and/or topsoil layer is not necessary, Accordingly, at least a portion of the grassy swale prefilter is preferably located below ground level. This below ground portion 104 of the prefilter preferably comprises at least one outlet 103 and one or more filtration elements, such as filter basket 106 as well. An above ground portion 105 of prefilter 100 rests on the surface of the grassy swale, with this above ground prefilter portion preferably comprising one or more additional filtration elements, such as removable filter screens 107.

Figure 3:
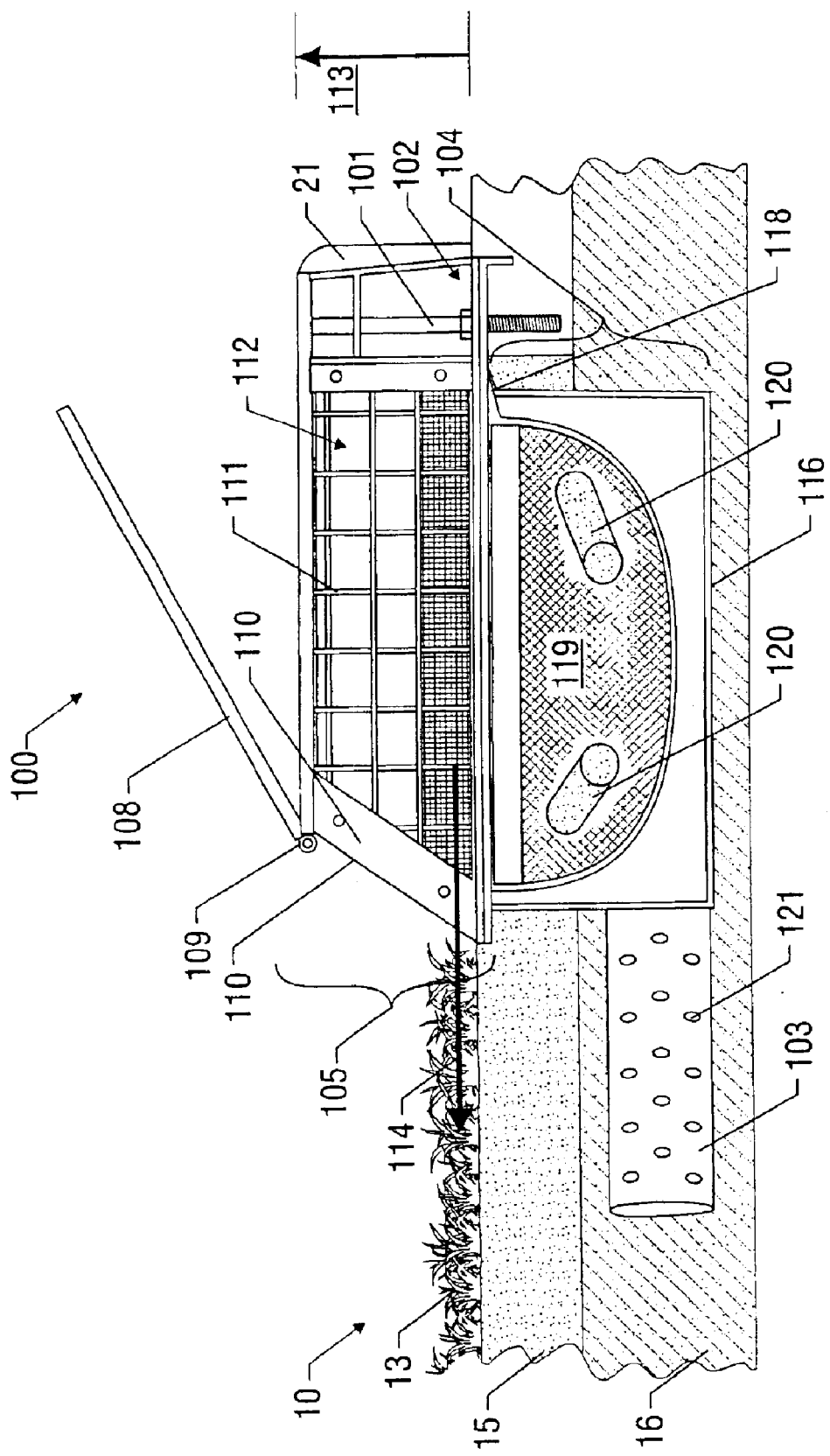
FIG. 3 is a side cross-sectional view of an exemplary grassy swale prefilter according to one embodiment of the present invention.

Referencing FIG. 3, an exemplary grassy swale prefilter according to one embodiment of the present invention is illustrated in side cross-sectional view. Grassy swale prefilter 100 is coupled to and preferably optimally oriented with respect to curb 21 and grassy swale inlet 20. As such, this grassy swale inlet effectively doubles as the inlet 102 of prefilter 100. One or more elements of a structural framework of the grassy swale prefilter are preferably attached to support posts 101, which are anchored into the curb or other firm support means as described above. Such a structural framework element may include a lid 108, which preferably comprises a hinge 109 or other displacement means such that the internal components of prefilter 100 can be accessed for installation, repair, replacement and maintenance purposes. Alternatively, lid 108 may comprise a removable panel, such that a hinge is not necessary.

One or more structural elements connect the inlet of the grassy swale prefilter to the outlet. Structural elements generally encompass walls, panels, walled grids, basin or an overall frame and may include other elements. Other structural elements may be included as would be recognized by one of ordinary skill in the art. For example, a plurality of walls 110 along the sides and front of at least the above ground portion 105 of prefilter 100. In a preferred embodiment, walls 110 are formed from panels comprising grids 111, preferably of metal bars, although other suitable rigid and durable materials may be used. These grid panels 111 are doubled one on top of another, such that either the horizontal or the vertical sets of bars from two panels are in direct contact, thereby creating regular spacings or slots 112 between a combined panel pair. In this manner, one or more removable filter screens 107 may be readily slid into and out of, and adequately retained within these spacings between a combined grid panel pair. Although it is possible for removable filter screens 107 to completely fill all spacings or slots 112 in a metal grid wall 110, such an arrangement is discouraged, at least for adequate bypass purposes, as described below.

Each full wall 110 is preferably attached at both sides to another full wall 110 or abutted up against curb 21, such attachment being made via welds, clamps, brackets, ties or any other suitable means for affixing one wall to the other. In one embodiment, an overall frame is provided, such a frame providing additional structural rigidity in addition to creating a convenient means for attaching each wall 110 and lid 108 to the prefilter. Walls 110 are preferably formed at an angle with respect to the ground, for example 30 or 45 degrees, such that the internal volume of the prefilter and the surface area of each wall 110 is increased for a given prefilter height 113. In addition, such an angling tends to make it easier to remove and reinstall removable screens 107 to and from the grid panels 111 comprising walls 110.

In a particularly preferred embodiment, screens 107 situated within walls 110 provide a first bypass 114 for incoming fluid, such as a high flow bypass, as it is generally intended for substantially all incoming fluid to enter the prefilter and proceed to those components of the prefilter below ground level. Accordingly, storm water runoff or other passing fluid will generally not proceed through walls 110 and onward atop the grassy swale 10, except during high flow conditions, failure of the prefilter components below walls 110, or some other unusual operating condition. Should it not be possible for all incoming fluid to be processed by the components below walls 110, then this fluid will back up into the system and begin flowing through walls 110. Thus, it is particularly preferable that removable filter screens 107 be placed at least along the bottom most spacings 112 in walls 110, such that fluid that has become backed up to this stage receives at least a cursory filtering before passing on to the top of the grassy swale.

Should the high flow or failure condition worsen, the fluid will presumably back up to the point where it rises even above removable filter screens 107, as there are preferably one or more levels of spacings 112 in walls 110 that do not contain these screens. Accordingly, runoff or fluid will then pass directly through grid panels 111 in walls 110 and receive only a nominal level of filtration or treatment through the grid panels. Such a passage through grid panels 111 not having any filter screens 107 comprises a secondary or ultimate high flow bypass 115. In a particularly preferred embodiment, the sum of all cross-sectional areas for this secondary bypass 115 is equal to or greater than the cross-sectional area of grassy swale inlet 20, such that any blockage or backup of fluid into parking lot 12 will not be likely to be caused by the prefilter.

Again referencing FIG. 3, a walled basin 116 provides an additional structural framework component inside prefilter 100, albeit below ground level. In a particularly preferred embodiment, all incoming fluid is directed downward into this walled basin 116, which preferably contains one or more filtration and/or water treatment components. One or more filtration elements are connected to a structural element. Such filtration elements remove selected material from the passing fluid, such as debris, pollutants, and the like. For example, a removable filter basket 117 may be suspended into this walled basin, support for such basket being provided via one or more basket flanges 118 resting against a stable surface, such as the upper lip of walled basin 116 or a similar protrusion or lip in another support frame or structure member. Filter basket 117 is preferably comprised of one or more wall or floor elements that are permeable, or, alternatively, this filter basket simply comprises a support basket having significantly large apertures, such that fluid is not retained therein. In yet another embodiment, filter basket 117 comprises perforations in one or more wall or floor elements, such that fluid may readily pass therethrough after it has been filtered and/or treated by any components situated within the basket.

In any of these above situations, filter basket 117 preferably supports a removable filter lining 119, such filter lining being adapted to filter a significant portion of incoming runoff or fluid. Such a filer lining may be comprised of, for example, a monoweave filament material, varieties of which are well known in the art. Such a filter lining 119 is also preferably removably attached to filter basket 117 by any suitable removable attaching means (not shown), such as clips, ties, Velcro and the like.

In addition, one or more fluid displaceable adsorbent containers 120 are preferably removably attached to either of filter basket 117 or filter lining 119. Such containers, which may comprise a boom or sock, for example, can be filled with perlite, another siliceous material, or any other suitable adsorbent, such that oils, grease, hydrocarbons and the like are readily filtered or removed from fluid coming in contact with one or more fluid displaceable adsorbent containers 120. Such containers 120 are preferably removeably attached by any suitable means (not shown), such as clips, ties, Velcro and the like, and are suspended or otherwise positioned in such a manner so as to float or otherwise become displaced as filter lining 119 fills with fluid. Accordingly, any silt, sedimentation or debris that might collect atop such containers 120 will presumably rinse off or otherwise settle to the bottom of filter lining 119 as containers 120 become displaced, such that the effectiveness of these containers is optimized.

After any incoming fluid has progressed along the optimal fluid path flowing through prefilter inlet 102, into walled basin 116, along adsorbent containers 120, and through filter lining 119 and filter basket 117 (i.e. no bypass activity), the fluid proceeds on to outlet 103 extending from the bottom of walled basin 116. Such an outlet preferably comprises a perforated outlet pipe 121, such that fluid is dispersed into the grassy swale in a reasonable manner in several dispersal points. In a preferred embodiment, outlet pipe 121 can be below one or more grassy swale layers, such that passing fluid may more readily proceed to its ultimate drainage destination. For example, outlet pipe 121 may be disposed within a gravel layer 16 beneath topsoil layer 15 and grass layer 13. Alternatively, the outlet pipe from the prefilter can also be designed to release water at the surface level to allow contact with the swale as originally intended.

Figure 4:
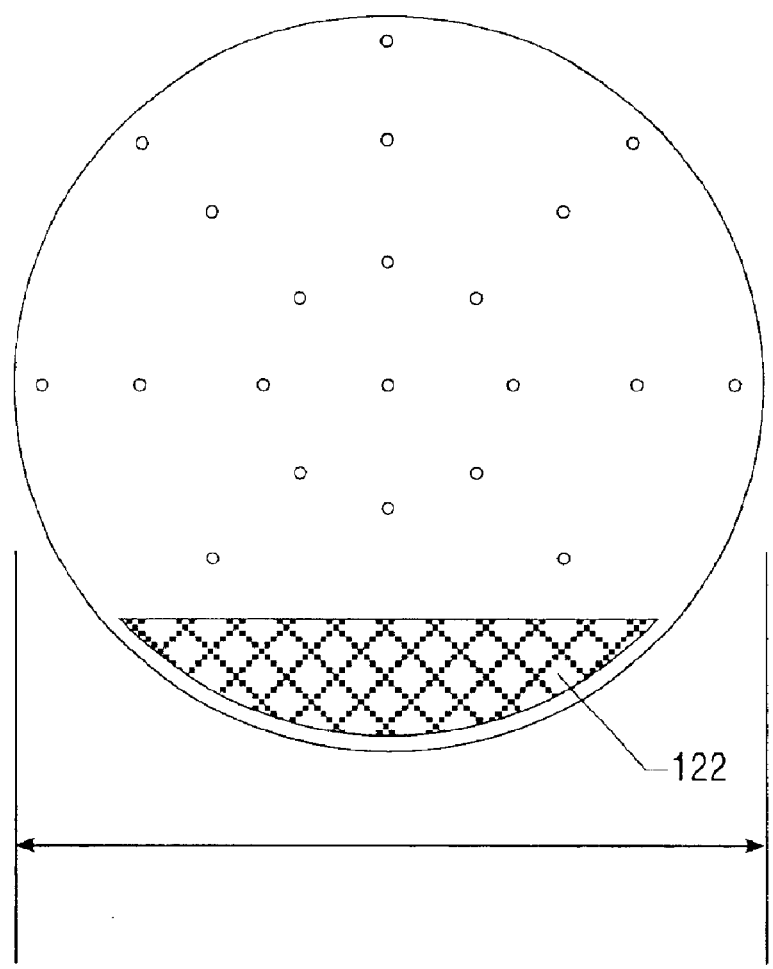
FIG. 4 is a partially cut-away top perspective view of the exemplary grassy swale prefilter illustrated in FIG. 3 according to one embodiment of the present invention.
Figure 4:
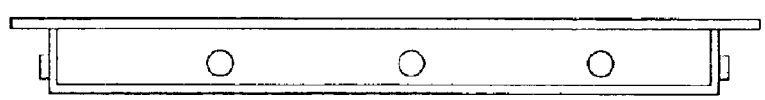
Figure 4:
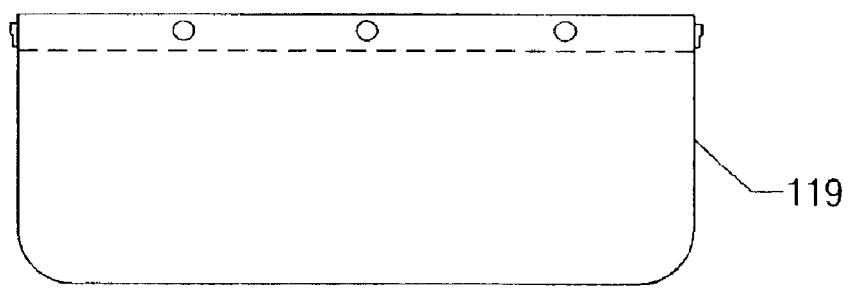

Turning now to FIG. 4, the exemplary grassy swale prefilter illustrated in FIG. 3 according to one embodiment of the present invention is shown in a partially cut-away top perspective view. Referencing FIGS. 3 and 4, the specific formation of prefilter inlet 102 directs substantially all incoming runoff or fluid into a "low flow entry region" 122, where most all low flows then fall into filter lining 119 within basket 117 and walled basin 116. Such an embodiment lends itself to a ready method for prefiltering fluid prior to entry into a grassy swale. Such a method generally comprises selecting one or more grassy swale inlets for installation, selecting one or more grassy swale prefilters for installation, coupling these selected grassy swale prefilters to these grassy swale inlets, and then passing fluid through these one or more grassy swale prefilters. Additional details or steps for such a method will be readily understood with reference to the foregoing detailed description of a grassy swale prefiliter.

In another embodiment of the present invention, chitosan can be applied at one or more locations inside the prefilter. Chitosan is a well-known material that is derived from a naturally occurring substance called chitin, which is a polysaccharide found in the exoskeleton of shellfish such as shrimp, lobster, and crabs. While chitosan has recently gained popularity as a dietary supplement, its inherent ability to generate small electrical charges has also provided benefits in the processing of contaminated items, such as wastewater. In turbid or polluted water, the electrical charges given off by chitosan react with the small electrical charges in pollution, fine silt and sediment particles, such that many of these tiny bits of contamination and silt coagulate together into larger chunks. These larger coagulated chunks of particles can then be filtered more easily from the fluid and are also more prone to settle to the bottom of the fluid body via gravity. An appropriate application of chitosan can render a body of muddy water as fairly clear in a short period of time. While chitosan and chitin have been previously used to some extent in the treatment of wastewater, their use has yet to reach the field of storm water runoff or other dirty water coming under other concerns of the Clean Water Act, with its accompanying objective to filter or clarify such water.

Such chitosan is preferably located or applied at optimized locations within the prefilter, such that its exposure to passing runoff or other fluid is maximized. As a result, the chitosan enhanced prefilter is capable of coagulating fine solids in fluids, such that passage of pollution, silt and sediment through the fine openings in any of the various filtration elements is reduced. Chitosan is available commercially from several sources, with one example being Vanson, Inc. of Redmond, Wash. Chitosan can be obtained in a basic white or beige granular or powdery form, or alternatively, may come in a liquid form or in a gel time-release form. Such forms are commercially available, for example, from Vanson, Inc. under the trade names "Storm Klear Liqui-Floc" and "Storm Klear Gel Floc" respectively. Although any form of chitosan may be applied to a grassy swale prefilter in any way, use of a time release gel form is preferred. Alternatively, other forms, such as a powder or liquid, may also be applied to the prefilter as deemed effective.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and moifications may be practiced, and it is understood that the invention is not to limited by the forgoing details, but rather is to be defined by the scope of the appended claims.

What is claimed is:

1. An apparatus adapted to cooperatively engage with a grassy swale, comprising:
   an inlet, said inlet adapted to deliver fluid therethrough;
   an outlet, said outlet adapted to deliver fluid therethrough;
   one or more structural elements, said one or more structural elements connecting said inlet to said outlet; and
   one or more filtration elements, said one or more filtration elements attached to at least one of said one or more structural elements.

2. The apparatus of claim 1, wherein said apparatus is adapted to cooperatively engage with an inlet to a grassy swale.

3. The apparatus of claim 1, wherein said outlet comprises a perforated pipe.

4. The apparatus of claim 1, wherein said one or more structural elements comprise a walled basin.

5. The apparatus of claim 1, wherein said one or more structural elements comprise a hinged lid.

6. The apparatus of claim 1, wherein said one or more filtration elements comprise a removable filter basket.

7. The apparatus of claim 6, further comprising a filter liner disposed within said removable filter basket.

8. The apparatus of claim 1, wherein said one ore more filtration elements comprise one or more removably attached filtration screens.

9. The apparatus of claim 1, further comprising one ore more fluid displaceable adsorbent containers.

10. The apparatus of claim 1, further comprising ome or more applications of chitosan located within apparatus.

11. A grassy swale prefilter, comprising:
   a structural framework adapted to support said one or more filtration elements;
   an inlet, said inlet being connected to said structural framework and adapted to deliver fluid therethrough;
   an outlet, said outlet being connected to said structural framework and adapted to deliver fluid therethrough;
   a walled basin, said walled basin being connected to said structural framework and containing one or more filtration elements; and
   one or more filtration screens, said one or more filtration screens being disposed above said walled basin and removably attached to said structural framework.

12. The grassy swale prefilter of claim 11, further comprising a hinged lid connected to and disposed above said structural framework.

13. The grassy swale prefilter of claim 11, wherein said one or more filtration elements comprise a removable filter basket.

14. The grassy swale prefilter of claim 13, further comprising a filter liner disposed within said removable filter basket.

15. The grassy swale prefilter of claim 11, further comprising one or more fluid displaceable adsorbent containers removably attached to at least one of said one or more filtration elements or said structural framework.

16. The grassy swale prefilter of claim 11, further comprising one or more applications of chitosan located within said structural framework.

17. A method of prefiltering fluid prior to entry into a grassy swale, comprising:
   selecting an inlet of said grassy swale;
   selecting a grassy swale prefilter;
   coupling said grassy swale prefilter to said grassy swale inlet; and
   passing fluid through said grassy swale prefilter.

18. The method of claim 17, wherein said grassy swale prefilter comprises:
   a structural framework adapted to support one or more filtration elements;
   an inlet, said inlet being connected to said structural framework and adapted to deliver fluid therethrough;
   an outlet, said outlet being connected to said structural framework and adapted to deliver fluid therethrough;
   a walled basin, said walled basin being connected to said structural framework and containing one or more filtration elements; and
   one or more filtration screens, said one or more filtration screens being disposed above said walled basin and removably attached to said structural framework.

* * * * *